(12) United States Patent
Ueno

(10) Patent No.: US 8,537,341 B2
(45) Date of Patent: Sep. 17, 2013

(54) PHYSICAL QUANTITY SENSOR AND PHYSICAL QUANTITY MEASURING METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 669 days.

(21) Appl. No.: 12/724,567

(22) Filed: Mar. 16, 2010

(65) Prior Publication Data

US 2011/0228254 A1    Sep. 22, 2011

(51) Int. Cl.
*G01C 3/08* (2006.01)

(52) U.S. Cl.
USPC ....... 356/5.09; 356/3.01; 356/4.01; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | | |
|---|---|---|---|---|
| 2008/0079949 | A1* | 4/2008 | Kuroiwa | 356/496 |
| 2008/0181354 | A1 | 7/2008 | Ueno | |
| 2008/0304042 | A1* | 12/2008 | Ueno | 356/4.1 |

FOREIGN PATENT DOCUMENTS

| EP | 1 953 567 A2 | 8/2008 |
|---|---|---|
| JP | 02-287109 | 11/1990 |
| JP | 04-089507 | 3/1992 |
| JP | 11-201722 | 7/1999 |
| JP | 11-234353 | 8/1999 |
| JP | 2001-255202 | 9/2001 |
| JP | 2006-313080 | 11/2006 |

OTHER PUBLICATIONS

Bosch et al., "A Low-Cost, Optical Feedback Laser Range-Finder with Chirp-Control"; IEEE Instrumentation and Measurement Technology Conference; May 21-23, 2001; pp. 1070-1074.
Tucker et al., "Laser Range Finding Using the Self-Mixing Effect in a Vertical-Cavity Surface-Emitting Laser"; 2002 Conference on Optoelectronics and Microelectronic Materials and Devices; Dec. 11-13, 2002; pp. 583-586.

* cited by examiner

*Primary Examiner* — Luke Ratcliffe
(74) *Attorney, Agent, or Firm* — Drinker Biddle & Reath LLP

(57) ABSTRACT

A physical quantity sensor includes: a semiconductor laser which emits laser light to a measurement target; an oscillation wavelength modulating device that operates the semiconductor laser such that at least one of a first oscillation period and a second oscillation period alternately exists; a detector that detects an electrical signal including interference waveforms, the interference waveforms being caused by a self-coupling effect of the laser light and return light from the measurement target; a signal extracting device that measures each cycle of the interference waveforms whenever the interference waveform is input; a cycle correcting device that compares each cycle of the interference waveforms with a reference cycle to correct the cycles of the interference waveforms; and a calculating device that calculates at least one of displacement and velocity of the measurement target based on each of the cycles of the interference waveforms corrected by the cycle correcting device.

15 Claims, 9 Drawing Sheets

0.5T0

T  Tnext 1.5T0

2.5T0

PHYSICAL QUANTITY SENSOR AND PHYSICAL QUANTITY MEASURING METHOD

BACKGROUND

1. Technical Field

The present invention relates to a physical quantity sensor and a physical quantity measuring method for measuring displacement and velocity of an object based on interference information generated by a self-coupling effect of laser light emitted from a semiconductor laser and return light from the object.

2. Related Art

In a frequency modulated continuous wave (FMCW) radar, a standing wave radar, a self-mixing type laser sensor or the like, a displacement (velocity) measuring method using the interference principle generally uses signal processing such as a Fast Fourier Transform (FFT), counting processing of interference patterns or the like to calculate displacement or velocity of a measurement target based on beats or a frequency of interference patterns. However, data having long sampling period and high sampling frequency are required to achieve high resolution using the FFT, which may require an enormous amount of processing time. In addition, in the counting processing of interference patterns, a sensor needs to be physically vibrated or an analysis of an amplitude of the interference patterns needs to be made to have a measure displacement smaller than a half wavelength, which results in a limitation on vibration measurement which is periodical movement of a measurement object and the counting processing of interference patterns takes a long time.

The present inventors have suggested a wavelength modulation-typed laser measuring instrument using a self-coupling effect of a semiconductor laser (see e.g., JP-A-2006-313080). FIG. 20 shows a configuration of this laser measuring instrument. The laser measuring instrument of FIG. 20 includes: a semiconductor laser 201 which emits laser light toward an object 210; a photodiode 202 which converts light output from the semiconductor laser 201 into electrical signals; a lens 203 which collects the light from the semiconductor laser 201 to direct the light toward the object 210, and also collects return light from the object 210 to direct the light toward the semiconductor laser 201; a laser driver 204 which drives the semiconductor laser 201 to alternately switch between a first oscillation period during which an oscillation wavelength continuously increases and a second oscillation period during which the oscillation wavelength continuously decreases; a Transimpedance AMPLIFIER 205 which converts an output current from the photodiode 202 into a voltage and amplifies the voltage; a signal extracting circuit 206 which twice differentiates an output voltage of the Transimpedance AMPLIFIER 205; a counting circuit 207 which counts the number of mode hop pulses (MHPs) included in an output voltage of the signal extracting circuit 206; a computing device 208 which calculates a distance to the object 210 and a velocity of the object 210; and a display device 209 which displays a calculation result of the computing device 208.

The laser driver 204 supplies a triangular wave driving current as an injection current, which is repeatedly increased or decreased at a certain variation rate with respect to time, to the semiconductor laser 201. This allows the semiconductor laser 201 to be driven to alternately switch between a first oscillation period during which an oscillation wavelength continuously increases at a certain variation rate and a second oscillation period during which the oscillation wavelength continuously decreases at a certain variation rate. FIG. 21 is a view showing a temporal change of the oscillation wavelength of the semiconductor laser 201. In FIG. 21, P1 represents the first oscillation period, P2 represents the second oscillation period, λa represents the minimum value of the oscillation wavelength for each period, λb represents the maximum value of the oscillation wavelength for each period, and Tt represents a cycle of a triangular wave.

The laser light emitted from the semiconductor laser 201 is collected by the lens 203 and is then incident onto the object 210. Light reflected from the object 210 is collected by the lens 203 and is then incident into the semiconductor laser 201. The photodiode 202 converts light output from the semiconductor laser 201 into a current. The Transimpedance AMPLIFIER 205 converts an output current from the photodiode 202 into a voltage and amplifies the voltage. The signal extracting circuit 206 twice differentiates an output voltage of the Transimpedance AMPLIFIER 205. The counting circuit 207 counts the number of mode hop pulses (MHPs) included in an output voltage of the signal extracting circuit 206 for each of the first oscillation period P1 and the second oscillation period P2. The computing unit 208 calculates a distance to the object 210 and a velocity of the object 210 based on the minimum oscillation wavelength λa of the semiconductor laser 201, the maximum oscillation wavelength λb thereof, the number of MHPs in the first oscillation period P1 and the number of MHPs in the second oscillation period P2. Such a self-coupling type laser measuring instrument can perform a displacement measurement of a resolution of about half-wavelength of the semiconductor laser 201 and a distance measurement of a resolution which is inversely proportional to the amount of wavelength modulation of the semiconductor laser 201.

Also, US2008/181354 discloses a counting correction technique.

The self-coupling type laser measuring instrument as described above can measure displacement and velocity of a measurement target with a resolution higher than that in the FMCW radar, standing wave radar, self-mixing type laser sensor and the like in the related art. However, since this self-coupling type laser measuring instrument requires a certain amount of measurement time (a half cycle of a carrier wave of oscillation wavelength modulation of a semiconductor laser in JP-A-2006-313080) for calculation of the same displacement and velocity as FFT, measurement errors occur in measurement of a measurement object whose velocity change is rapid. In addition, since there is a need to count the number of MHPs for signal processing, it is difficult to achieve a resolution less than a half wavelength of the semiconductor laser.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages described above.

Accordingly, it is an illustrative aspect of the present invention to provide a physical quantity sensor and a physical quantity measuring method which are capable of measuring displacement and velocity of an object with high resolution and reducing time taken for measurement.

According to one or more illustrative aspects of the present invention, there is provided a physical quantity sensor. The physical quantity sensor includes: a semiconductor laser which emits laser light to a measurement target; an oscillation wavelength modulating device configured to operate the semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period; a detector configured to detect an electrical signal including interference waveforms, the interference waveforms being caused by a self-coupling effect of the laser light emitted from the semiconductor laser and return light from the measurement target; a signal extracting device configured to measure each cycle of the interference waveforms whenever the interference waveform is input; a cycle correcting device configured to compare each cycle of the interference waveforms received from the signal extracting device with a reference cycle so as to correct the cycles of the interference waveforms; and a calculating device configured to calculate at least one of displacement and velocity of the measurement target based on each of the cycles of the interference waveforms corrected by the cycle correcting device.

According to one or more illustrative aspects of the present invention, k may be substantially 0.5. Of course, the meaning of "k is substantially 0.5" includes the value of 0.5.

According to one or more illustrative aspects of the present invention, there is provided a physical quantity measuring method. The method includes: (a) operating a semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period; (b) detecting an electrical signal including interference waveforms, the interference waveforms being caused by a self-coupling effect of the laser light emitted from the semiconductor laser and return light from the measurement target; (c) measuring each cycle of the interference waveform whenever the interference waveform is input; (d) comparing each cycle of the interference waveforms with a reference cycle so as to correct the cycles of the interference waveforms; and (e) calculating at least one of displacement and velocity of the measurement target based on each of the cycles of the interference waveforms corrected in step (d).

According to one or more illustrative aspects of the present invention, there is provided a computer readable medium storing a computer program. The computer program causes a computer to execute a process for measuring physical quantity. The process includes: (a) operating a semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period; (b) detecting an electrical signal including interference waveforms, the interference waveforms being caused by a self-coupling effect of the laser light emitted from the semiconductor laser and return light from the measurement target; (c) measuring each cycle of the interference waveform whenever the interference waveform is input; (d) comparing each cycle of the interference waveforms with a reference cycle so as to correct the cycles of the interference waveforms; and (e) calculating at least one of displacement and velocity of the measurement target based on each of the cycles of the interference waveforms corrected in step (d).

According to the present invention, by performing a calculation operation based on cycles of individual interference waveforms, it is possible to measure displacement and velocity of a measurement target with higher resolution than as in the related art. In addition, while the self-coupling type laser measuring instrument in the related art requires measurement time of a half cycle of a carrier wave, the present invention can obtain the displacement and velocity of the measurement target from cycles of individual interference waveforms, which results in a significant reduction of time required for measurement and makes it possible to cope with a measurement target whose change of velocity is rapid. In addition, in the present invention, by comparing a measurement result of a signal extracting device with a reference cycle, since any error in cycles of interference waveforms can be corrected, it is possible to improve the precision of the measurement of displacement and velocity.

Other aspects and advantages of the present invention will be apparent from the following description, the drawings and the claims.

DETAILED DESCRIPTION OF EXEMPLARY EMBODIMENTS

First Embodiment

Figure 1:
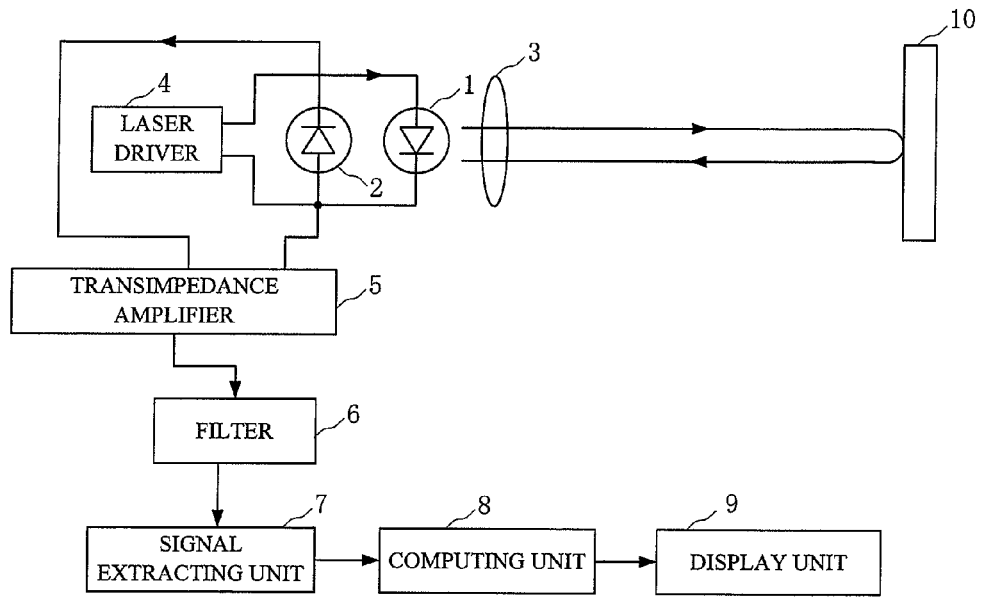
FIG. 1 is a block diagram showing a configuration of a physical quantity sensor according to a first embodiment of the present invention.

Hereinafter, embodiments of the present invention will be described with reference to the drawings. FIG. 1 is a block diagram showing a configuration of a physical quantity sensor according to a first embodiment of the present invention.

As shown in FIG. 1, the physical quantity sensor includes: a semiconductor laser 1 which emits laser light to an object 10 to be measured; a photodiode 2 which converts light output from the semiconductor laser 1 into an electrical signal; a lens 3 which collects the light from the semiconductor laser 1 to direct the light toward the object 10 and collects return light from the object 10 to direct the light toward the semiconductor laser 1; a laser driver 4 serving as an oscillation wavelength modulation unit to drive the semiconductor laser 1; a Transimpedance AMPLIFIER 5 which converts an output current from the photodiode 2 into a voltage and amplifies the voltage; a filter 6 which removes a carrier wave from an output voltage of the Transimpedance AMPLIFIER 5; a signal extracting unit 7 which measures a cycle of a mode hop pulse (MHP) as a self-coupling signal included in an output voltage of the filter 6; a computing unit 8 which calculates displacement and velocity of the object 10 based on individual cycles measured by the signal extracting unit 7; and a display unit 9 which displays a calculation result of the computing unit 8.

The photodiode 2 and the Transimpedance AMPLIFIER 5 constitute a detector. Hereinafter, for the sake of simplifying description, it is assumed that the semiconductor laser 1 is implemented by a type having no mode hopping effect (VCSEL type or DFB laser type).

Figure 21:
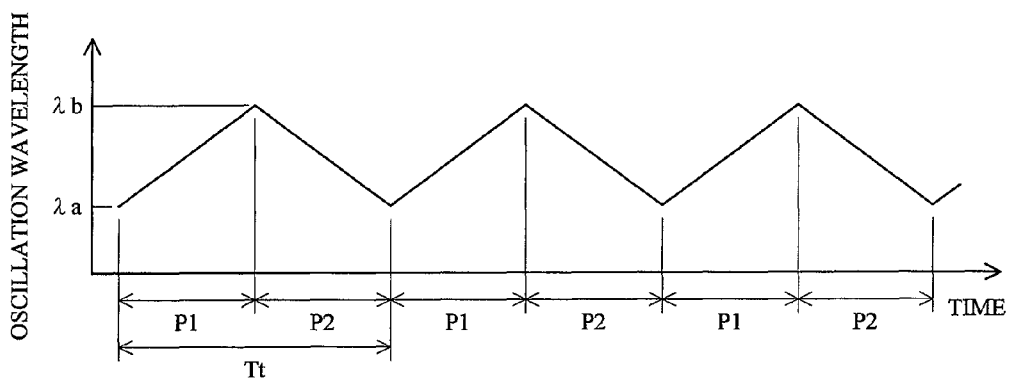
FIG. 21 is a diagram showing one example of a temporal change of an oscillation wavelength of a semiconductor laser in the laser measuring instrument shown in FIG. 20.

The laser driver 4 supplies a triangular driving current as an injection current, which is repeatedly increased or decreased at a certain variation rate with respect to time, to the semiconductor laser 1. This allows the semiconductor laser 1 to be driven to alternately switch between a first oscillation period P1 during which an oscillation wavelength continuously increases in proportion to a magnitude of the injection current at a certain variation rate and a second oscillation period P2 during which the oscillation wavelength continuously decreases at a certain variation rate. The temporal change of the oscillation wavelength of the semiconductor laser 1 at this time is as shown in FIG. 21. In this embodiment, it is required that a change speed of the oscillation wavelength of the semiconductor laser 1 should be constant.

The laser light emitted from the semiconductor laser 1 is collected by the lens 3 and is then incident onto the object 10. The light reflected by the object 10 is collected by the lens 3 and is then incident into the semiconductor laser 1. However, it is not necessary to perform the light collection by the lens 3. The photodiode 2 is placed inside or near the semiconductor laser 1 and converts light output from the semiconductor laser 1 into a current. The Transimpedance AMPLIFIER 5 converts an output current of the photodiode 2 into a voltage and amplifies the voltage.

Figure 2A:
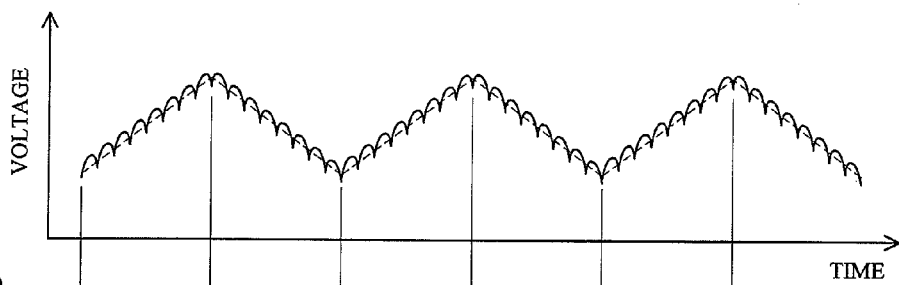
FIGS. 2A and 2B are schematic waveform diagrams showing an output voltage waveform of a Transimpedance AMPLIFIER and an output voltage waveform of a filter according to the first embodiment.
Figure 2B:
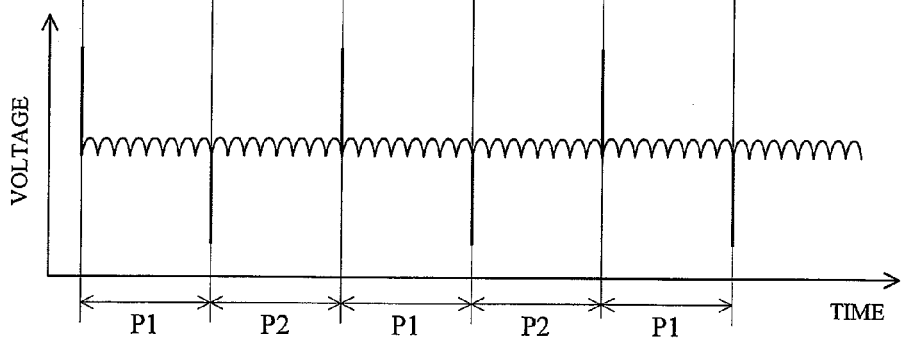

The filter 6 serves to extract a superposition signal from a modulated wave. FIG. 2A is a schematic waveform diagram showing an output voltage waveform of the Transimpedance AMPLIFIER 5, and FIG. 2B is a schematic waveform diagram showing an output voltage waveform of the filter 6. These diagrams show a process of removing an oscillation waveform (carrier wave) of the semiconductor laser 1 of FIG. 1 from the waveform (modulated wave) of FIG. 2A to extract a MHP waveform (interference waveform) of FIG. 2B.

Figure 3:
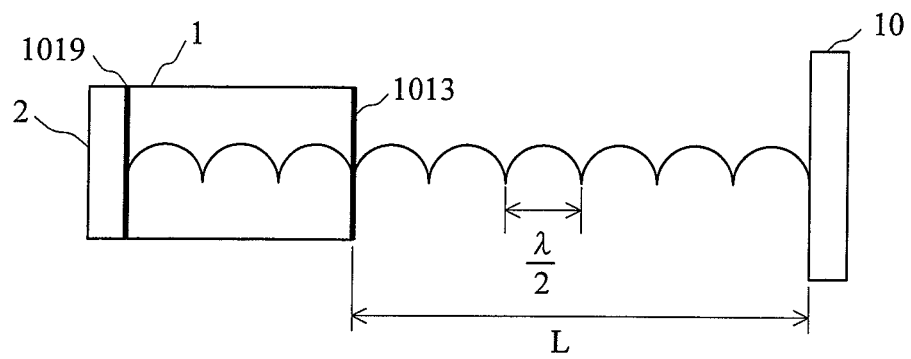
FIG. 3 is a diagram for explaining a mode hop pulse.

Next, the signal extracting unit 7 measures a MHP cycle included in the output voltage of the filter 6 whenever the MHP occurs. Here, the MHP as a self-coupling signal will be now described. As shown in FIG. 3, assuming that a distance from a mirror layer 1013 to the object 10 is L and a laser oscillation wavelength is λ, the return light from the object 10 and laser light in a resonator of the semiconductor laser 1 strengthen and slightly increase a laser output when the following resonance condition is satisfied.

$$L=q\lambda/2 \qquad (1)$$

In the equation (1), q is an integer. This effect can be sufficiently observed as an amplification operation occurs due to increase in reflectivity of external appearance in the resonator of the semiconductor laser 1 even if scattered light from the object 10 is very weak.

Figure 4:
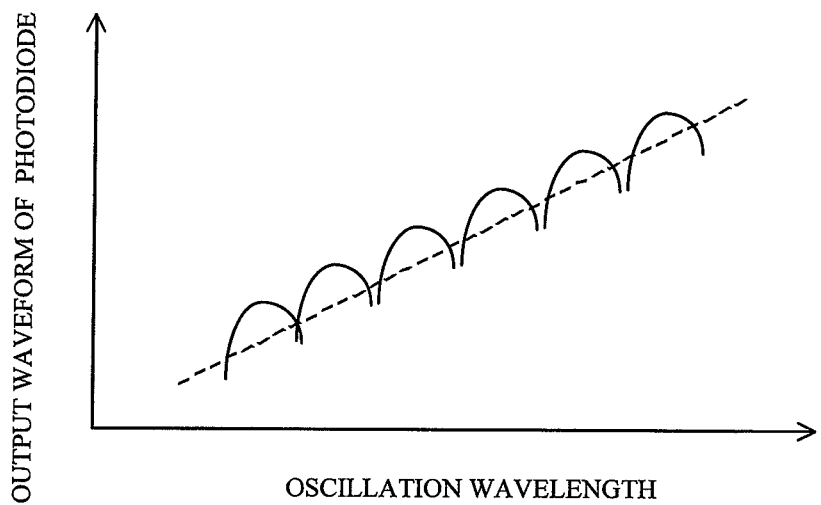
FIG. 4 is a diagram showing a relationship between an oscillation wavelength of a semiconductor laser and an output waveform of a photodiode.

FIG. 4 is a diagram showing a relationship between an oscillation wavelength of the semiconductor laser 1, which is changed at a certain rate, and the output waveform of the photodiode 2. When the condition, L=qλ/2, shown in the equation (1) is satisfied, a phase difference between the return light and the laser light in the light resonator becomes 0° (in phase) so that the return light and the laser light in the light resonator can strengthen to a maximum. If L=qλ/2+λ/4, the phase difference becomes 180° (out of phase) so that the return light and the laser light in the light resonator can weaken to a maximum. Accordingly, when the oscillation wavelength of the semiconductor laser 1 is changed, a portion where a laser output is strengthened and a portion where the laser output is weakened are alternately repeated. At this time, when the laser output is detected by the photodiode 2, a step-shaped waveform with a certain cycle can be obtained as shown in FIG. 4. This waveform is generally called "interference pattern". Each of the step-shaped waveforms, i.e., the interference pattern, is MHP. As described above, when the oscillation wavelength of the semiconductor laser 1 is changed for a certain period of time, the number of MHPs is changed in proportion to a measurement distance.

Figure 5:
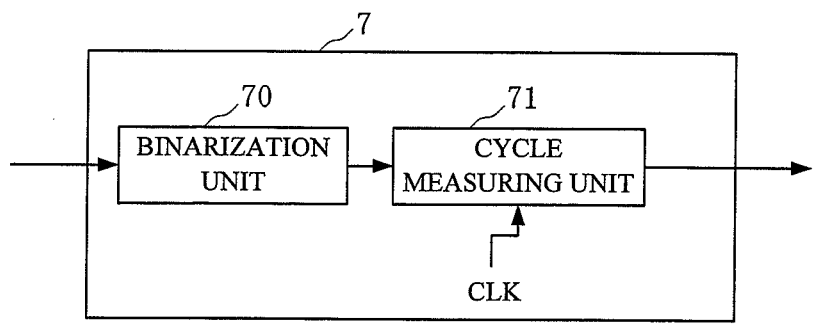
FIG. 5 is a block diagram showing an example configuration of a signal extracting unit according to the first embodiment.

FIG. 5 is a block diagram showing an example configuration of the signal extracting unit 7. The signal extracting unit 7 includes a binarization unit 70 and a cycle measuring unit 71.

Figure 6A:
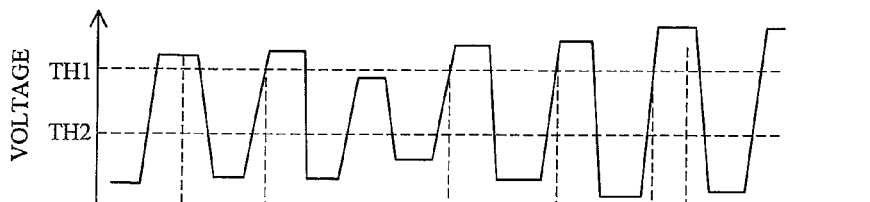
FIGS. 6A to 6D are diagrams for explaining operation of the signal extracting unit according to the first embodiment.
Figure 6B:
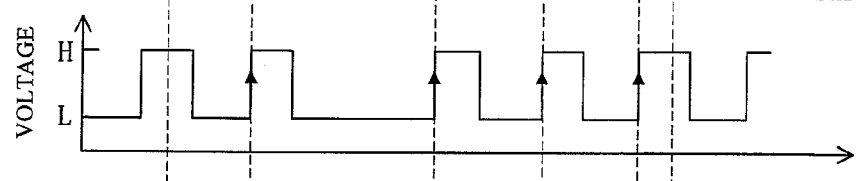
Figure 6C:
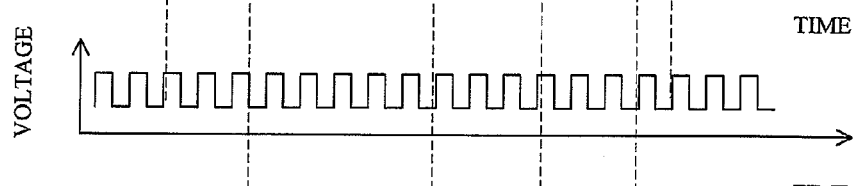
Figure 6D:
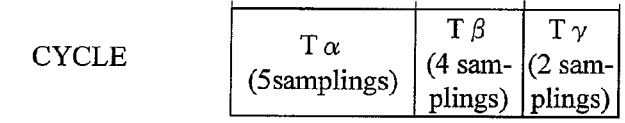

FIGS. 6A to 6D are diagrams for explaining operation of the signal extracting unit 7. FIG. 6A is a schematic diagram showing a waveform of an output voltage of the filter 6, that is, a MHP waveform, FIG. 6B is a diagram showing an output of the binarization unit 70 corresponding to FIG. 6A, FIG. 6C is a diagram showing a sampling clock CLK input to the signal extracting unit 7, and FIG. 6D is a diagram showing a measurement result of the cycle measuring unit 71 corresponding to FIG. 6B.

First, the binarization unit 70 of the signal extracting unit 7 determines whether the output voltage of the filter 6 as shown in FIG. 6A is at a high (H) level or a low (L) level and outputs a result of the determination as shown in FIG. 6B. At this time, the binarization unit 70 binarizes the output voltage of the filter 6 by determining the output voltage of the filter 6 to be the high level when the output voltage rises to equal to or more than a threshold TH1 and by determining the output voltage of the filter 6 to be the low level when the output voltage rises to equal to or less than a threshold TH2 (TH2<TH1).

The cycle measuring unit 71 measures a cycle of a rising edge (that is, a MHP cycle) of an output of the binarization unit 70 whenever the rising edge occurs. At this time, the cycle measuring unit 71 measures the MHP cycle, with a cycle of the sampling clock CLK as shown in FIG. 6C as one unit. In the example of FIG. 6D, the cycle measuring unit 71 sequentially measures $T\alpha$, $T\beta$ and $T\gamma$ as cycles of MHP. As can be seen from FIGS. 6C and 6D, sizes of the cycles $T\alpha$, $T\beta$ and $T\gamma$ are 5 [samplings], 4 [samplings] and 2 [samplings], respectively. A frequency of the sampling clock CLK is assumed to be sufficiently high over the highest frequency which can acquire MHP.

Figure 7:
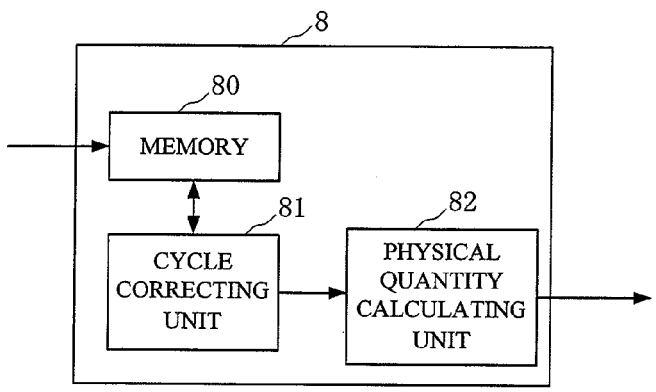
FIG. 7 is a block diagram showing an example configuration of a computing unit according to the first embodiment.

Next, the computing unit 8 calculates displacement and velocity of the object 10 from a change of cycles of respective MHPs based on the measurement result of the signal extracting unit 7. FIG. 7 is a block diagram showing an example configuration of the computing unit 8. The computing unit 8 includes a memory 80, a cycle correcting unit 81 and a physical quantity calculating unit 82.

The memory 80 stores the measurement result of the signal extracting unit 7. The cycle correcting unit 81 sets one of shift averages of MHP cycles at the time when the object 10 is in a static state, MHP cycles for the calculated distance, or cycles of a predetermined number of MHPs measured immediately before this correction, as a reference cycle T0 and corrects the measurement result of the signal extracting unit 7 by comparing this measurement result of the signal extracting unit 7 with the reference cycle T0. FIGS. 8A to 8F are diagrams for explaining operation of the cycle correcting unit 81.

Figure 8A:
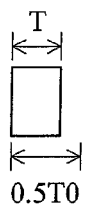
FIGS. 8A to 8F are diagrams for explaining operations of a cycle correcting unit according to the first embodiment.
Figure 8B:
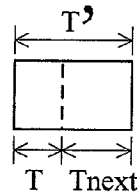

If the cycle T of MHP measured by the signal extracting unit 7 is less than 0.5 T0 as shown in FIG. 8A, the cycle correcting unit 81 sets a sum cycle, which is the sum of the cycle T of MHP and a cycle Tnext of MHP measured next time, as a correction cycle T' of MHP as shown in FIG. 8B.

Figure 8C:
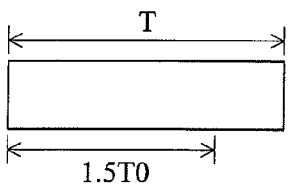
Figure 8D:
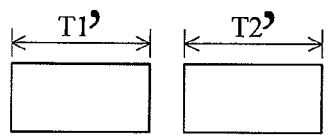

In addition, if the cycle T of MHP measured by the signal extracting unit 7 is equal to or more than 1.5 T0 and less than 2.5 T0 as shown in FIG. 8C, the cycle correcting unit 81 sets cycles obtained by splitting in half the cycle T of MHP as corrected T1' and T2', respectively, as shown in FIG. 8D.

Figure 8E:
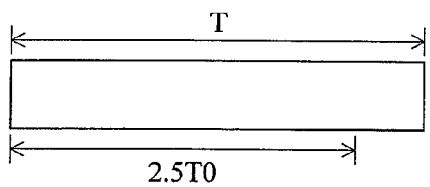
Figure 8F:
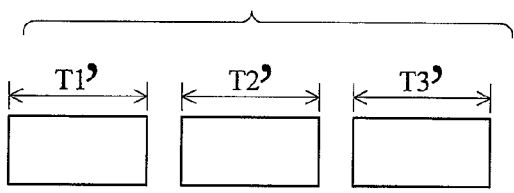

In addition, if the cycle T of MHP measured by the signal extracting unit 7 is equal to or more than 2.5 T0 and less than 3.5 T0 as shown in FIG. 8E, the cycle correcting unit 81 sets cycles obtained by splitting in thirds the cycle T of MHP as correction cycles T1', T2' and T3', respectively, as shown in FIG. 8F. The process is of the same for equal to or more than 3.5 T0. That is, if the cycle T of MHP measured by the signal extracting unit 7 is equal to or more than (m−0.5) T0 and less than (m+0.5) T0 (m is a natural number equal to or more than 2), the cycle correcting unit 81 sets cycles obtained by dividing each of the cycle T of MHP into m equal parts as correction cycles. The cycle correcting unit 81 performs the above correction process whenever the measurement result is output from the signal extracting unit 7.

Figure 9:
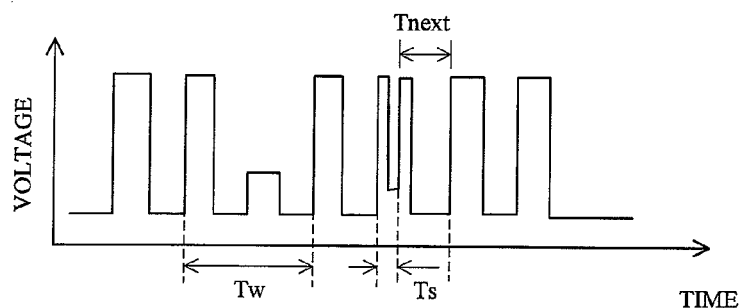
FIG. 9 is a diagram for explaining the correction principle of a measurement result of the signal extracting unit according to the first embodiment.

FIG. 9 is a diagram for explaining the correction principle of the measurement result of the signal extracting unit 7, schematically showing a waveform of the output voltage of the filter 6, that is, a MHP waveform.

Although a MHP cycle is originally varied depending on a distance to the object 10, MHP appears with the same cycle if a distance to the object 10 is not variable. However, due to noise, a drop in a MHP waveform or a waveform which should not be counted as a signal may be included in the MHP waveform, which may result in an error in the MHP cycle.

If a signal drop occurs, a cycle Tw of MHP at a position where the drop occurs becomes about two times as large as the original cycle. That is, if the MHP cycle is about two or more times as large as the reference cycle T0, it may be determined that the signal drop occurs. Thus, the signal drop can be corrected by splitting in half the cycle Tw.

In addition, cycle Ts of MHP at a position where noise is counted becomes about 0.5 time as large as the original cycle. That is, if the MHP cycle is about 0.5 or less times as large as the reference cycle T0, it may be determined that signals are excessively counted. Thus, noise counted wrongly can be corrected by adding the cycle Ts and the cycle Tnext which is the cycle to be measured next.

The correction principle of the measurement result of the signal extracting unit 7 has been hitherto described. In this embodiment, a threshold for determining the cycle Ts at a position where noise is counted is set to be 0.5 times as large as the reference cycle T0 and a threshold for determining the cycle Tw at a position where a signal drop occurs is set to be 1.5 times, and not 2 times, as large as the reference cycle T0, the reason will be described later.

Next, the physical quantity calculating unit 82 calculates the displacement and velocity of the object 10 from a change of individual cycles of MHP corrected by the cycle correcting unit 81 with respect to the reference cycle T0. Assuming that a sampling clock frequency is fad [Hz], the reference cycle is T0 [samplings], an oscillation average wavelength of the semiconductor laser 1 is $\lambda$ [m], and a corrected MHP cycle is increased by n [samplings] over the reference cycle T0, a displacement D [m] of the object 10 for the corrected MHP cycle is expressed by the following equation.

$$D = n \times \lambda/(2 \times T0) \qquad (2)$$

If the corrected MHP cycle is decreased by n [samplings] below the reference cycle T0, a sign of the cycle variation n in the equation (2) may be negative. In the first oscillation period P1 for which the oscillation wavelength of the semiconductor laser 1 is increased, if the displacement D is positive, a shift direction of the object 10 is a direction in which the object 10 is far away from the semiconductor laser 1. If the displacement D is negative, the shift direction of the object 10 is a direction in which the object 10 approaches the semiconductor laser 1. In addition, in the second oscillation period P2 for which the oscillation wavelength is decreased, if the displacement D is positive, the shift direction of the object 10 is the direction in which the object 10 approaches the semiconductor laser 1. If the displacement D is negative, the shift direction of the object 10 is the direction in which the object 10 moves further away from the semiconductor laser 1.

In addition, since the corrected MHP cycle is (T0+n)/fad, a velocity V [m/s] of the object 10 in the corrected MHP cycle is expressed by the following equation.

$$V = n \times \lambda/(2 \times T0) \times \text{fad}/(T0+n) \qquad (3)$$

The physical quantity calculating unit 82 can calculate the displacement D of the object 10 based on the equation (2) and the velocity V of the object 10 based on the equation (3). For example, assuming that the sampling clock frequency fad is 16 [MHz], the reference cycle T0 is 160 [samplings], the average wavelength of the semiconductor laser 1 is 850 [nm], and the corrected MHP cycle is increased by 1 [samplings] over the reference cycle T0, the displacement D and velocity V of the object 10 in this MHP cycle can be calculated to be 5.31 [nm] and 1.05 [mm/s], respectively. The physical quantity calculating unit 82 performs the above-described calculating process for each corrected MHP cycle.

The display unit 9 displays a result of the calculation by the computing unit 8.

It is here assumed that the number of MHP related to the distance to the object 10 per half cycle of the carrier wave (triangular wave) of the oscillation wavelength modulation of the semiconductor laser 1 is N1. Assuming that an absolute value of the maximum velocity of the object 10 is $\lambda/2 \times Na$ in terms of the displacement per one cycle of the carrier wave, the number of MHPs per half cycle of the carrier wave is N1±Na. If the displacement per one cycle of the carrier wave is moving at a velocity of $\lambda/2 \times Nb$, since the number of MHPs per half cycle of the carrier wave is N1+Nb, a MHP cycle corresponding to this number is observed. In order to obtain the displacement D and velocity V of the object 10, the number of MHPs per half cycle of the carrier wave may be reversely calculated from individual MHP cycles and the displacement D and velocity V of the object 10 may be calculated based on this number of MHPs. The above equations (2) and (3) are based on this derivation principle.

In the self-coupling type laser measuring instrument disclosed in JP-A-2006-313080, the resolution of displacement and velocity of an object is about half wavelength $\lambda/2$ of the semiconductor laser. On the contrary, in this embodiment, since the resolution of the displacement D and velocity V is $\lambda/2 \times n/T0$, it is possible to realize the resolution which is less than the half wavelength $\lambda/2$, which results in measurement of higher resolution than as in the related art.

As described above, in this embodiment, it is possible to measure the displacement D and velocity V of the object 10 with higher resolution than as in the related art. In addition, while the self-coupling type laser measuring instrument disclosed in JP-A-2006-313080 requires measurement time of a half cycle of a carrier wave, this embodiment can obtain the displacement D and velocity V of the object 10 from individual MHP cycles, which results in significant reduction of time required for measurement and makes it possible to cope with an object 10 whose change of velocity is rapid. In addition, in this embodiment, since any error in MHP cycles can be corrected, it is possible to improve the measurement precision of the displacement D and velocity V.

In addition, since the individual MHP cycles include an unbalance in a normal distribution even when the object 10 is in a static state, a process such as shift averaging or the like may be performed for the calculated displacement.

In addition, although both of the displacement and velocity of the object 10 are measured in this embodiment, of course, it will be understood that only one of the displacement and velocity may be measured.

Figure 10:
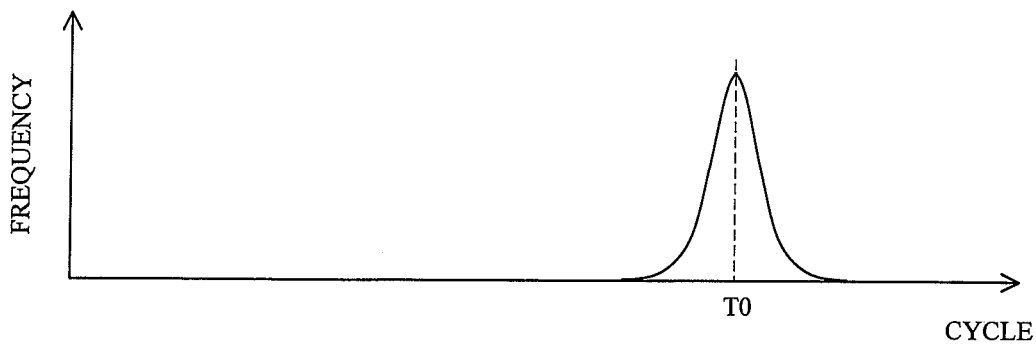
FIG. 10 is a diagram showing a frequency distribution of a cycle of the mode hop pulse.

Next, the reason why the threshold for determining the cycle Tw at a position where a signal drop occurs is set to be 1.5 times as large as the reference cycle T0 will be now described. If a change in the oscillation wavelength of the semiconductor laser 1 is linear, the MHP cycles are normally distributed around the reference cycle T0 (FIG. 10).

Figure 11:
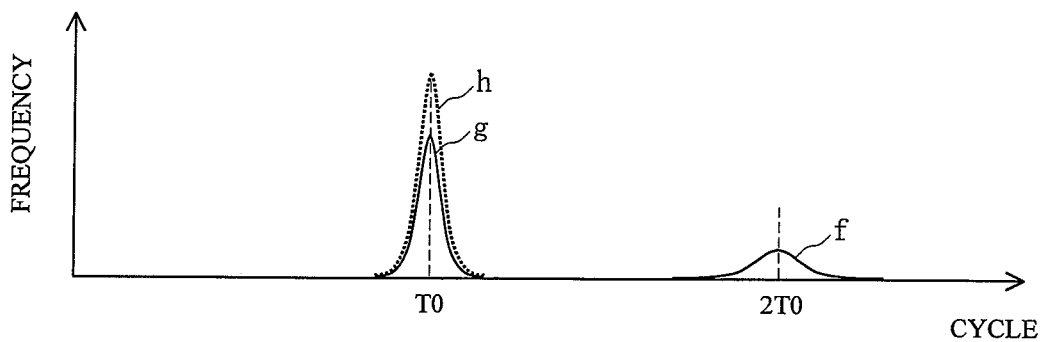
FIG. 11 is a diagram showing a frequency distribution of a cycle of the mode hop pulse having a twofold cycle.

Here, a case where a drop occurs in MHP waveforms is considered. Since the MHP cycles, when a drop occurs in measurement because the strength of MHP is small, have a normal distribution around the original MHP cycle T0, they have a normal distribution with the mean value of 2T0 and the standard deviation of $\sqrt{2}\cdot\delta$ (see "f" in FIG. 11). Assuming that j [%] of MHPs are dropped and the number of MHPs counted by the signal extracting unit 7 for one of the first oscillation period P1 and the second oscillation period P2 is N, the frequency of the MHP cycles doubled due to this drop is Nw (=j [%]·N). In addition, the frequency of an approximate cycle of T0 after reduction due to the drop in measurement is "g" as shown in FIG. 11 and the reduction of the frequency as shown by h in FIG. 11 is 2Nw (=2j [%]). Accordingly, for one of the first oscillation period P1 and the second oscillation period P2, the original number N' of MHPs when no drop of MHP has occurred can be expressed by the following equation.

$$N' = N + j[\%] = N + Nw \quad (4)$$

Figure 12:
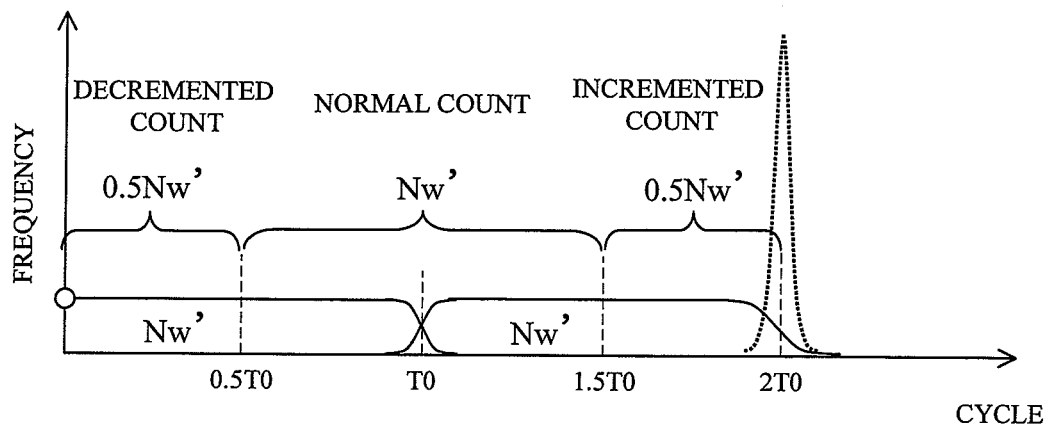
FIG. 12 is a diagram showing a frequency distribution of a cycle of the halved mode hop pulse out of mode hop pulses missed in counting.

Next, a threshold for correcting the measurement result of the MHP cycles will be now described. It is here assumed that p [%] of the frequency Nw of the MHP cycles doubled due to the drop in the measurement is split in half. Out of the dropped MHPs, the frequency of the halved MHP cycles is Nw'(=j·p [%]·N). Again, a frequency distribution of the halved MHP cycles is as shown in FIG. 12. Assuming that a threshold of a cycle shown with Nw is 1.5 T0, the frequency of the MHP cycles with the cycle equal to or less than 0.5 T0 is 0.5 Nw'(=0.5 p [%]·Nw), the frequency of the MHP cycles with the cycle ranging from 0.5 T0 to 1.5 T0 is Nw'(=p [%]·Nw), and the frequency of the MHP cycles with the cycle equal to or more than 1.5 T0 is 0.5 Nw'(=0.5 p [%]·Nw).

Figure 13:
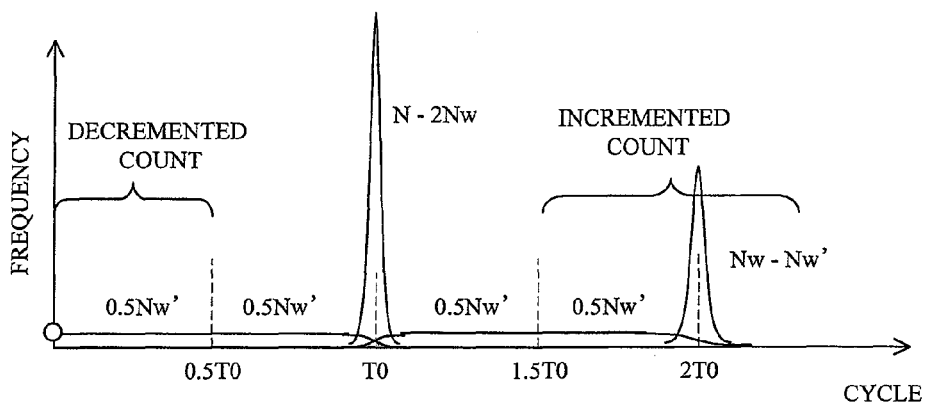
FIG. 13 is a diagram showing a frequency distribution of a cycle of the halved mode hop pulse out of mode hop pulses missed in counting.

Accordingly, the frequency distribution of all MHP cycles is as shown in FIG. 13, and assuming that a threshold of the frequency Ns of cycles corresponding to the above Ts is 0.5 T0 and a threshold of the frequency Nw of cycles corresponding to the above Tw is 1.5 T0, a counting result N can be expressed by the following equation.

$$N = (N' - 2Nw) + (Nw - Nw') + 2Nw' = N' - Nw + Nw' \quad (5)$$

According to the equation (5), a corrected result can be expressed by the following equation to calculate the original number N' of MHPs when no drop of MHP has occurred in measurement.

$$N - 0.5Nw' + (0.5Nw' + (Nw - Nw')) = \quad (6)$$
$$(N - Nw + Nw') + (0.5Nw' + (Nw - Nw')) = N'$$

Accordingly, it can be seen that the counting result N can be corrected when the threshold of cycles when the frequency Nw is obtained is set to be 1.5 times as large as the reference cycle T0. Assuming that the number of samplings per half cycle of the triangular wave is M, since the MHP cycle T and the counting result N have a relationship of T=M/N and M is a constant value, it can be seen that a threshold for determining the cycle Tw at which a signal drop may be considered to occur can be set to be 1.5 times as large as the reference cycle T0, as in the counting result N.

Although the reference cycle T0 is set as the MHP cycle when the object 10 is in a static state, this embodiment is not limited thereto. For example, the computing unit 8 may set a shift average of a predetermined number of MHP cycles measured immediately before correction as the reference cycle T0. According to this method, it is possible to obtain the reference cycle T0 even for an object 10 which cannot be made to be stationary.

Second Embodiment

Figure 14:
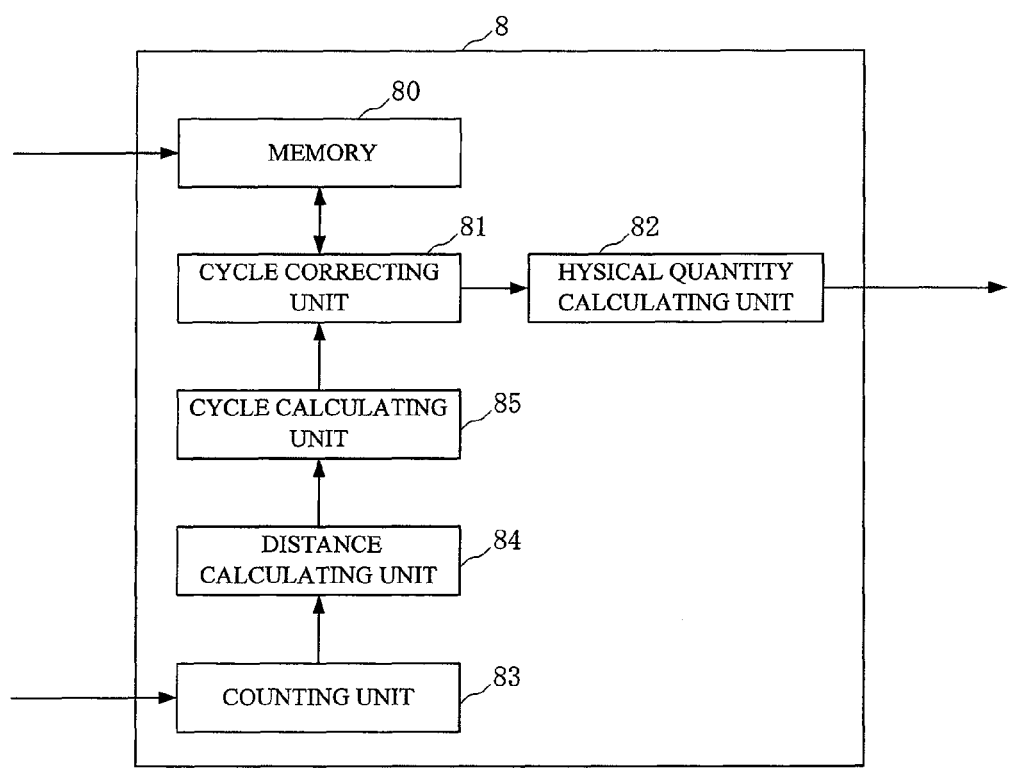
FIG. 14 is a block diagram showing an example configuration of a computing unit according to a second embodiment of the present invention.

Next, a second embodiment of the present invention will be now described. FIG. 14 is a block diagram showing an example configuration of the computing unit 8 according to the second embodiment of the present invention. The computing unit 8 includes: a memory 80; a cycle correcting unit 81; a physical quantity calculating unit 82; a counting unit 83; a distance calculating unit 84; and a cycle calculating unit 85. The physical quantity sensor of this embodiment has the same entire configuration as that in the first embodiment except that it is required that a change speed of the oscillation wavelength of the semiconductor laser 1 is constant, the maximum value of the oscillation wavelength $\lambda b$ and the minimum value of the oscillation wavelength $\lambda a$ are constant and a difference ($\lambda b - \lambda a$) therebetween is also constant.

The counting unit 83 counts the number of MHPs included in the output of the filter 6 for each of the first oscillation period P1 and the second oscillation period P2. The counting unit 83 may employ a counter composed of logic gates or may measure a frequency of MHP (that is, the number of MHPs per unit time) using Fast Fourier Transform (FFT).

Next, the distance calculating unit 84 calculates a distance to the object 10 based on the minimum oscillation wavelength $\lambda a$, maximum oscillation wavelength $\lambda b$ of the semiconductor laser 1 and the number of MHPs counted by the counting unit 83. In this embodiment, the object 10 has one of a micro displacement state to satisfy a predetermined condition and a displacement state with motion higher than that of the micro displacement state. Assuming that an average displacement of the object 10 per one period of the oscillation period P1 and the oscillation period P2 is V, the object 10 satisfies the condition, $(\lambda b - \lambda a)/\lambda b > V/Lb$ (where Lb is a distance at time t), for the micro displacement state and the condition, $(\lambda b - \lambda a)/\lambda b \leq V/Lb$, for the displacement state.

First, the distance calculating unit 84 calculates distance candidate values $L\alpha(t)$ and $L\beta(t)$ and velocity candidate values $V\alpha(t)$ and $V\beta(t)$ at current time t according to the following equations.

$$L\alpha(t) = \lambda a \times \lambda b \times (MHP(t-1) + MHP(t))/\{4 \times (\lambda b - \lambda a)\} \quad (7)$$

$$L\beta(t) = \lambda a \times \lambda b \times (|MHP(t-1) - MHP(t)|)/\{4 \times (\lambda b - \lambda a)\} \quad (8)$$

$$V\alpha(t) = (MHP(t-1) - MHP(t)) \times \lambda b/4 \quad (9)$$

$$V\beta(t) = (MHP(t-1) + MHP(t)) \times \lambda b/4 \quad (10)$$

In the equations (7) to (10), MHP(t) represents the number of MHPs calculated at current time t and MHP(t−1) represents the number of MHPs calculated in the period prior to MHP(t). For example, assuming that MHP(t) is a counting result of the first oscillation period P1, MHP(t−1) is a counting result of the second oscillation period P2. Conversely, assuming that MHP(t) is a counting result of the second oscillation period P2, MHP(t−1) is a counting result of the first oscillation period P1.

The candidate values $L\alpha(t)$ and $V\alpha(t)$ are values calculated under the presumption that the object 10 is in the micro displacement state and the candidate values $L\beta(t)$ and $V\beta(t)$ are values calculated under the presumption that the object 10 is in the displacement state. The distance calculating unit 84 performs the computation of the equations (7) to (10) for each time at which the number of MHPs is measured by the counting unit 83 (i.e., for each oscillation period).

Subsequently, the distance calculating unit 84 calculates a history displacement, which is a difference between a distance candidate value at current time t and a distance candidate value at prior period, for each of the micro displacement state and the displacement state according to the following equations.

$$Vcal\alpha(t) = L\alpha(t) - L\alpha(t-1) \quad (11)$$

$$Vcal\beta(t) = L\beta(t) - L\beta(t-1) \quad (12)$$

In the equations (11) and (12), the distance candidate values calculated in period prior to current time t are assumed as $L\alpha(t-1)$ and $L\beta(t-1)$.

The history displacement $Vcal\alpha(t)$ is a value calculated under the presumption that the object 10 is in the micro displacement state and the history displacement $Vcal\beta(t)$ is a value calculated under the presumption that the object 10 is in the displacement state. The distance calculating unit 84 performs the computation of the equations (11) and (12) for each time at which the number of MHPs is measured by the counting unit 83. In addition, in the equations (9) to (12), a direction in which the object 10 approaches the physical quantity sensor of this embodiment is defined as a positive velocity and a direction in which the object 10 moves further away from the physical quantity sensor is defined as a negative velocity.

Next, the distance calculating unit 84 determines a state of the object 10 based on results of the computation of the equations (7) to (12).

As described in JP-A-2006-313080, if the sign of the history displacement $Vcal\alpha(t)$ calculated under the presumption that the object 10 is in the micro displacement state is constant and averages of absolute values of the velocity candidate values $V\alpha(t)$ and history displacement $Vcal\alpha(t)$ calculated under the presumption that the object 10 is in the micro displacement state are equal to each other, the distance calculating unit 84 determines that the object 10 is moving at a constant velocity in the micro displacement state.

In addition, as described in JP-A-2006-313080, if the sign of the history displacement $Vcal\beta(t)$ calculated under the presumption that the object 10 is in the displacement state is constant and averages of absolute values of the velocity candidate values $V\beta(t)$ and history displacement $Vcal\beta(t)$ calculated under the presumption that the object 10 is in the displacement state are equal to each other, the distance calculating unit 84 determines that the object 10 is moving at a constant velocity in the displacement state.

In addition, as described in JP-A-2006-313080, if the sign of the history displacement $Vcal\alpha(t)$ calculated under the presumption that the object 10 is in the micro displacement state is inverted for each time at which the number of MHPs is measured and averages of absolute values of the velocity candidate values $V\alpha(t)$ and history displacement $Vcal\alpha(t)$ calculated under the presumption that the object 10 is in the micro displacement state are not equal to each other, the distance calculating unit 84 determines that the object 10 is moving at a velocity other than a constant velocity in the micro displacement state.

In addition, paying attention to the velocity candidate value $V\beta(t)$, the absolute value of $V\beta(t)$ becomes a constant which is equal to a wavelength variation rate $(\lambda b - \lambda a)/\lambda b$ of the semiconductor laser 1. Therefore, if the absolute value of the velocity candidate value $V\beta(t)$ calculated under the presumption that the object 10 is in the displacement state is equal to the wavelength variation rate and averages of absolute values of the velocity candidate values $V\alpha(t)$ and history displacement $Vcal\alpha(t)$ calculated under the presumption that the object 10 is in the micro displacement state are not equal to each other, the distance calculating unit 84 may determine that the object 10 is moving at a velocity other than a constant velocity in the micro displacement state.

In addition, as described in JP-A-2006-313080, if the sign of the history displacement $Vcal\beta(t)$ calculated under the presumption that the object 10 is in the displacement state is inverted for each time at which the number of MHPs is measured and averages of absolute values of the velocity candidate values $V\beta(t)$ and history displacement $Vcal\beta(t)$ calculated under the presumption that the object 10 is in the displacement state are not equal to each other, the distance calculating unit 84 determines that the object 10 is moving at a velocity other than a constant velocity in the displacement state.

In addition, paying attention to the velocity candidate value Vα(t), the absolute value of Vα(t) becomes a constant which is equal to a wavelength variation rate (λb−λa)/λb of the semiconductor laser 1. Therefore, if the absolute value of the velocity candidate value Vα(t) calculated under the presumption that the object 10 is in the displacement state is equal to the wavelength variation rate and averages of absolute values of the velocity candidate values Vβ(t) and history displacement Vcalβ(t) calculated under the presumption that the object 10 is in the displacement state are not equal to each other, the distance calculating unit 84 may determine that the object 10 is moving at a velocity other than a constant velocity in the displacement state.

The distance calculating unit 84 determines the distance to the object 10 based on a result of the above determination. That is, the distance calculating unit 84 sets the distance candidate value Lα(t) as the distance to the object 10 if it is determined that the object 10 is moving at a constant velocity in the micro displacement state. Meanwhile, the distance calculating unit 84 sets the distance candidate value Lβ(t) as the distance to the object 10 if it is determined that the object 10 is moving at a constant velocity in the displacement state.

In addition, the distance calculating unit 84 sets the distance candidate value Lα(t) as the distance to the object 10 if it is determined that the object 10 is moving at a velocity other than a constant velocity in the micro displacement state. However, an actual distance corresponds to an average of distance candidate values Lα(t). In addition, the distance calculating unit 84 sets the distance candidate value Lβ(t) as the distance to the object 10 if it is determined that the object 10 is moving at a velocity other than a constant velocity in the displacement state. However, an actual distance corresponds to an average of distance candidate values Lβ(t).

Next, the cycle calculating unit 85 obtains a MHP cycle from the distance calculated by the distance calculating unit 84. A MHP frequency is in proportion to a measured distance and a MHP cycle is in inverse proportion to the measured distance. Therefore, when a relationship between the MHP cycle and the distance is in advance obtained and registered in a database (not shown) of the cycle calculating unit 85, the cycle calculating unit 85 can obtain the MHP cycle by acquiring the MHP cycle corresponding to the distance calculated by the distance calculating unit 84 from the database. Alternatively, if an equation expressing the relationship between the MHP cycle and the distance is in advance obtained and set, the cycle calculating unit 85 can calculate the MHP cycle by putting the distance calculated by the distance calculating unit 84 into the set equation.

The cycle correcting unit 81 may correct the measurement result of the signal extracting unit 7 with the cycle obtained by the cycle calculating unit 85 as the reference cycle T0, as described in the first embodiment. The physical quantity calculating unit 82 performs the same operation as the first embodiment. In this embodiment, the reference cycle T0 can be obtained even for an object 10 which cannot be made to be stationary.

Third Embodiment

Figure 15:
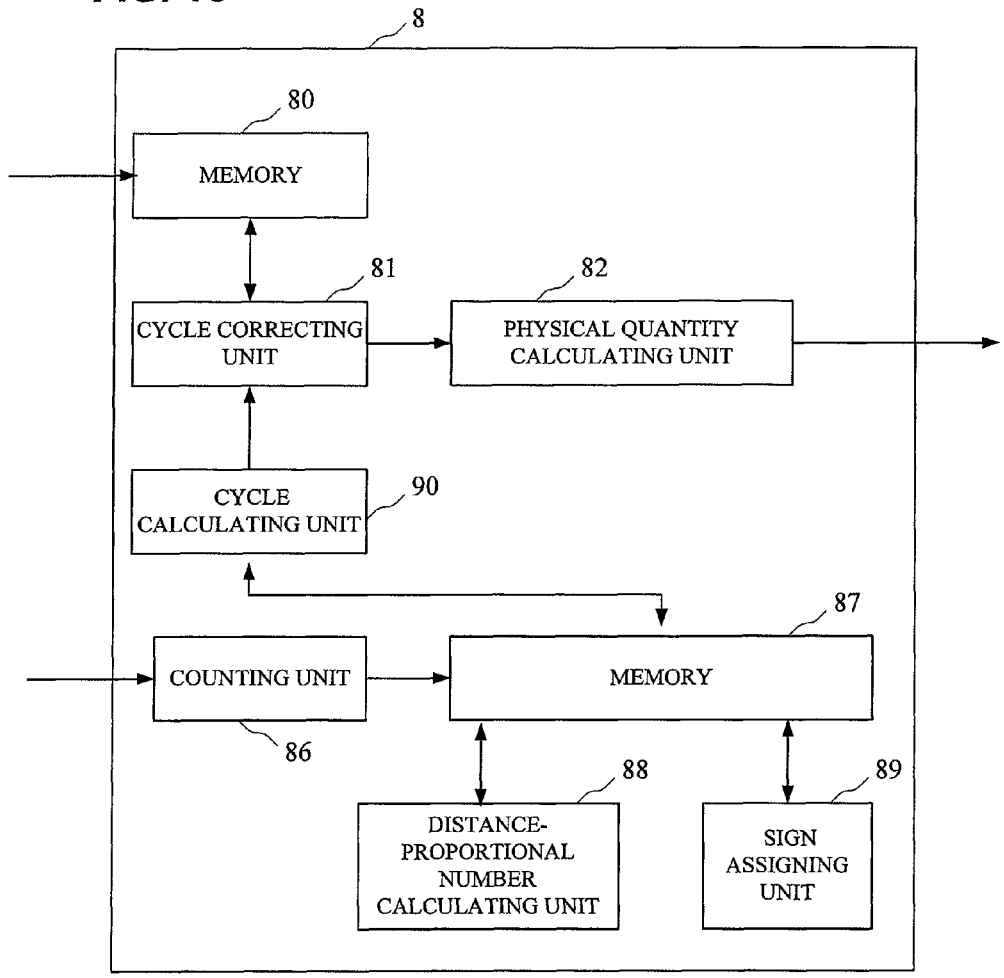
FIG. 15 is a block diagram showing an example configuration of a computing unit according to a third embodiment of the present invention.

Next, a third embodiment of the present invention will be now described. FIG. 15 is a block diagram showing an example configuration of a computing unit 8 according to a third embodiment of the present invention. The computing unit 8 includes: a memory 80; a cycle correcting unit 81; a physical quantity calculating unit 82; a counting unit 86 which counts the number of MHPs included in an output voltage of the filter 6; a memory 87 which stores a counting result of the counting unit 86; a distance-proportional number calculating unit 88 which obtains the number NL of MHPs proportional to an average distance between the semiconductor laser 1 and the object 10 (hereinafter referred to as "distance-proportional number") by calculating an average of counting results of the counting unit 86; a sign assigning unit 89 which assigns a positive/negative sign to the latest counting result of the counting unit 86 based on a magnitude relationship between the prior counting result of the counting unit 86 and twice the distance-proportional number NL calculated using a counting result prior to the prior counting result; and a cycle calculating unit 90 which calculates a MHP cycle based on the distance-proportional number NL. The physical quantity sensor of this embodiment may have the same entire configuration as that of the first embodiment.

The counting unit 86 counts the number of MHPs included in an output of the filter 6 for each of the first oscillation period P1 and the second oscillation period P2. The counting unit 86 may employ a counter composed of logic gates or may measure a MHP frequency (that is, the number of MHPs per unit time) using FFT. A counting result of the counting unit 86 is stored in the memory 87.

Figure 16:
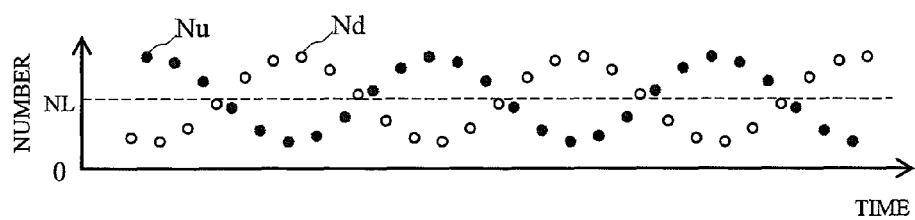
FIG. 16 is a diagram showing one example of a temporal change of a counting result of a counting unit according to the third embodiment.

The distance-proportional number calculating unit 88 obtains the distance-proportional number NL from the counting result of the counting unit 86. FIG. 16 is a diagram for explaining operation of the distance-proportional number calculating unit 88, showing a temporal change of the counting result of the counting unit 86. In FIG. 16, Nu and Nd represent a count result of the first oscillation period P1 and a count result of the second oscillation period P2, respectively.

If a distance variation rate of the object 10 is smaller than the oscillation wavelength of the semiconductor laser 1 and the object 10 is in a simple harmonic oscillation, temporal changes of the counting result Nu and the counting result Nd result in sinusoidal waveforms with a phase difference of 180 degrees therebetween, as shown in FIG. 16. In JP-A-2006-313080, the object 10 is in the micro displacement state.

As is clear from FIG. 21, as the first oscillation period P1 alternates with the second oscillation period P2, the counting result Nu also alternates with the counting result Nd. Each of the counting results Nu and Nd is the sum of or difference between the distance-proportional number NL and the number NV of MHPs proportional to the displacement of the object 10 (hereinafter referred to as "displacement-proportional number"). The distance-proportional number NL corresponds to an average of sinusoidal waveforms shown in FIG. 16. In addition, a difference between the counting result Nu (or Nd) and the distance-proportional number NL corresponds to the displacement-proportional number NV.

The distance-proportional number calculating unit 88 calculates the distance-proportional number NL by calculating an average of even-numbered counting results measured up to two periods before current time t according to the following equation.

$$NL=\{N(t-2)+N(t-3)\}/2 \qquad (13)$$

In the equation (13), N(t−2) and N(t−3) represent the number N of MHPs measured in the period two times before current time t and the number N of MHPs measured in the period three times before current time t, respectively. If a counting result N(t) at current time t is the counting result Nu of the first oscillation period P1, the counting result N(t−2) in the period two times before current time t is also the counting result Nu of the first oscillation period P1 and the counting result N(t−3) in the period three times before current time t is the counting result Nd of the second oscillation period P2. On the contrary, if the counting result N(t) at current time t is the counting result Nd of the second oscillation period P2, the counting result N(t−2) in the period two times before current time t is also the counting result Nd of the second oscillation period P2 and the counting result N(t−3) in the period three times before current time t is the counting result Nu of the first oscillation period P1.

The equation (13) is an equation for obtaining the distance-proportional number NL from two counting results. If 2m (m is a positive integer) counting results are used, the distance-proportional number calculating unit 88 calculates the distance-proportional number NL according to the following equation.

$$NL=\{N(t-2m-1)+N(t-2m)+\ldots+N(t-2)\}/2m \quad (14)$$

However, the equations (13) and (14) are used at an initial state where the distance to the object 10 and the velocity of the object 10 begin to be measured. In the course of measurement, instead of the equation (13), the distance-proportional number NL is calculated according to the following equation using a sign-assigned counting result (described later).

$$NL=\{N'(t-2)+N'(t-3)\}/2 \quad (15)$$

Here, N'(t−2) and N'(t−3) represent a sign-assigned counting result obtained by subjecting the counting result N(t−2) measured in the period two times before current time t to sign assigning process (described later) and a sign-assigned counting result obtained by subjecting the counting result N(t−3) measured in the period three times before current time t to the sign assigning process, respectively. The equation (15) is used after the counting result N(t) at current time t became the seventh counting result after the start of measurement of the number of MHPs.

In addition, when the equation (14) is used at the measurement initial stage, in the course of measurement, instead of the equation (14), the distance-proportional number NL is calculated according to the following equation using the sign-assigned counting result.

$$NL=\{N'(t-2m-1)+N'(t-2m)+\ldots+N'(t-2)\}/2m \quad (16)$$

The equation (16) is used after the counting result N(t) at current time t became the (2m×2+3)-th counting result after the start of measurement of the number of MHPs.

The distance-proportional number NL is stored in the memory 87. The distance-proportional number calculating unit 88 performs the above process of calculating the distance-proportional number NL for each time at which the number of MHPs is measured by the counting unit 86 (i.e., for each oscillation period).

In addition, if the number of counting results used for the calculation of the distance-proportional number NL is sufficiently large, the distance-proportional number NL may be calculated from odd-numbered counting results.

Next, the sign assigning unit 89 assigns a positive/negative sign to the counting result N(t) of the counting unit 86 based on a magnitude relationship between the counting result N(t−1) measured prior to the current time t and twice the distance-proportional number NL (2NL). Specifically, the sign assigning unit 89 executes the following equations.

$$\text{If } N(t-1) \geqq 2NL, \text{ then } N'(t) \rightarrow -N(t) \quad (17)$$

$$\text{If } N(t-1) < 2NL, \text{ then } N'(t) \rightarrow +N(t) \quad (18)$$

Figure 17:
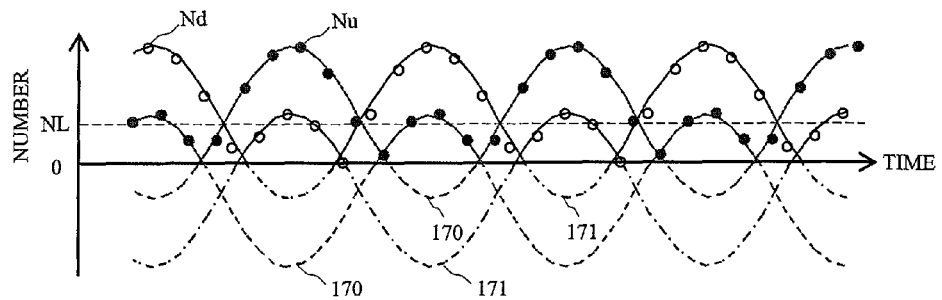
FIG. 17 is a diagram showing another example of the temporal change of the counting result of the counting unit according to the third embodiment.

FIG. 17 is a diagram for explaining operation of the sign assigning unit 89, showing a temporal change of the counting result of the counting unit 86. If a distance variation rate of the object 10 is larger than an oscillation wavelength variation rate of the semiconductor laser 1, the temporal change of the counting result Nu has a shape where a negative waveform shown by 170 in FIG. 17 is folded to a positive side. Similarly, the temporal change of the counting result Nd has a shape where a negative waveform shown by 171 in FIG. 17 is folded to a positive side. In JP-A-2006-313080, the object 10 at portions where these counting results are folded is in the displacement state. On the other hand, the object 10 at portions where these counting results are not folded is in the micro displacement state.

In order to obtain physical quantities of the object 10 in oscillation including the displacement state, it is necessary to determine whether the object 10 is in the displacement state or the micro displacement state and correct counting results folded to the positive side such that they draw traces shown by 170 and 171 in FIG. 17 if the object 10 is in the displacement state. The equations (17) and (18) are equations for determining whether the object 10 is in the displacement state or the micro displacement state. In FIG. 17, a relationship of N(t−1)≧2NL is established in the displacement state where the counting results are folded. Accordingly, as shown in the equation (17), if the relationship of N(t−1)≧2NL is established, assigning a negative sign to the counting result N(t) at current time t of the counting unit 86 is assumed as a sign-assigned counting result N'(t).

On the other hand, in FIGS. 16 and 17, a relationship of N(t−1)<2NL is established in the micro displacement state where the counting results are not folded. Accordingly, as shown in the equation (18), if the relationship of N(t−1)<2NL is established, assigning a positive sign to the counting result N(t) at current time t of the counting unit 86 is assumed as a sign-assigned counting result N'(t).

The sign-assigned counting result N'(t) is stored in the memory 87. The sign assigning unit 89 performs the above sign assigning process for each time at which the number of MHPs is measured by the counting unit 86 (i.e., for each oscillation period). In addition, the establishment condition of the equation (17) may be N(t−1)>2NL, while the establishment condition of the equation (18) may be N(t−1)≦2NL.

Next, the cycle calculating unit 90 calculates a MHP cycle T from the distance-proportional number NL according to the following equation.

$$T=C/(2 \times f \times NL), \quad (19)$$

where f and C represent a frequency of a triangular wave and the speed of light, respectively.

The cycle correcting unit 81 may correct a measurement result of the signal extracting unit 7, as described in the first embodiment, with the cycle calculated by the cycle calculating unit 90 as the reference cycle T0. The physical quantity calculating unit 82 has the same operation as the first embodiment. In this embodiment, the reference cycle T0 may be obtained even for an object 10 which cannot be made to be stationary.

Fourth Embodiment

Figure 18:
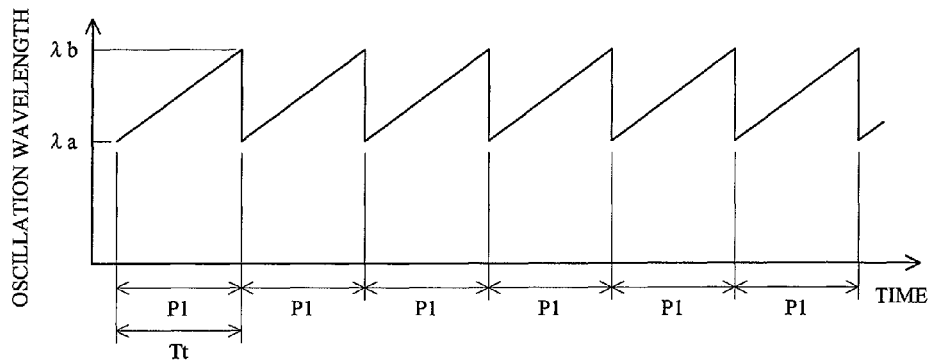
FIG. 18 is a diagram showing another example of a temporal change of an oscillation wavelength of a semiconductor laser according to a fourth embodiment of the present invention.

Next, a fourth embodiment of the present invention will be now described. Although it has been illustrated in the first to third embodiments that the semiconductor laser 1 is oscillated with the triangular waveform, these embodiments are not limited thereto. For example, the semiconductor laser 1 may be oscillated with a saw tooth waveform in the first and third embodiment, as shown in FIG. 18. That is, in this embodiment, the semiconductor laser 1 may be operated such that one of the first oscillation period P1 and the second oscillation period P2 repeatedly exists. However, for the second embodiment, it is necessary to oscillate the semiconductor laser 1 with the triangular waveform.

In oscillating the semiconductor laser 1 with the saw tooth waveform as in this embodiment, a change speed of the oscillation wavelength of the semiconductor laser 1 is required to be constant. The operation for the first oscillation period P1 or the second oscillation period P2 is the same as that in the triangular wave oscillation. As shown in FIG. 18, it will be understood that a process of the first oscillation period P1 may be repeatedly performed for oscillation of the saw tooth waveform where only the first oscillation period P1 repeatedly exists and a process of the second oscillation period P2 may be repeatedly performed for oscillation of the saw tooth waveform where only the second oscillation period P2 repeatedly exists.

Fifth Embodiment

Figure 19:
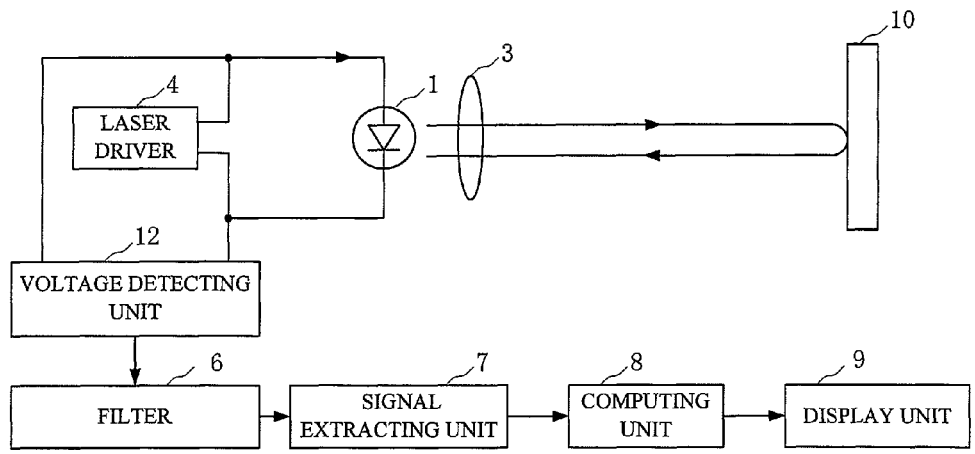
FIG. 19 is a block diagram showing a configuration of a physical quantity sensor according to a fifth embodiment of the present invention.
Figure 20:
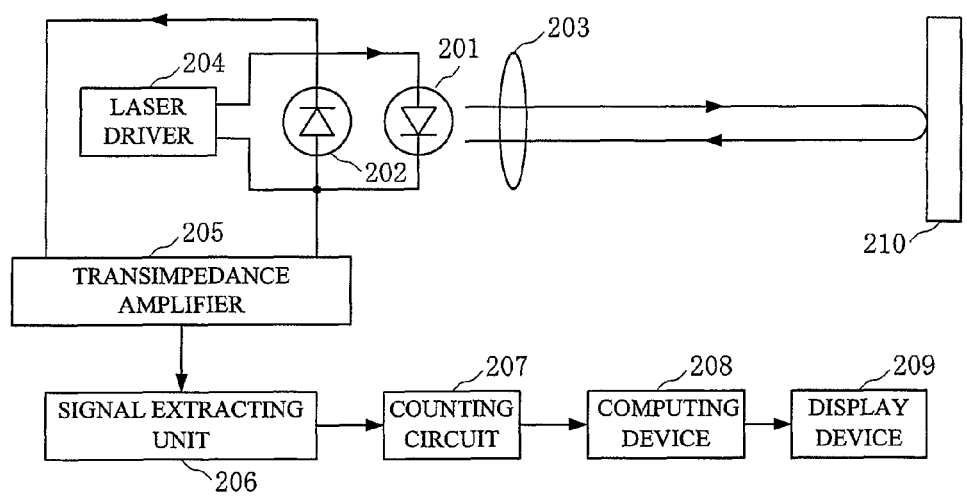
FIG. 20 is a block diagram showing a laser measuring instrument in the related art.

Next, a fifth embodiment of the present invention will be now described. Although it has been illustrated in the first to fourth embodiments that the photodiode 2 and the Transimpedance AMPLIFIER 5 are used as a detector that detects an electrical signal including a MHP waveform, of course, it is possible to extract the MHP waveform without using the photodiode. FIG. 19 is a block diagram showing a configuration of a physical quantity sensor according to the fifth embodiment of the present invention, in which the same elements as in FIG. 1 are denoted by the same reference numerals. The physical quantity sensor of this embodiment employs a voltage detector 12 as a detector instead of the photodiode 2 and the Transimpedance AMPLIFIER 5 of the first embodiment.

The voltage detector 12 detects and amplifies an interterminal voltage, i.e., an anode-cathode voltage, of the semiconductor laser 1. When laser light emitted from the semiconductor laser 1 interferes with return light from the object 10, an MHP waveform appears at the inter-terminal voltage of the semiconductor laser 1. Accordingly, it is possible to extract the MHP waveform from the inter-terminal voltage of the semiconductor laser 1.

A filter 6 removes a carrier wave from an output voltage of the voltage detector 12. Other configuration of the physical quantity sensor is the same as that of the first embodiment.

In this manner, in this embodiment, it is possible to extract the MHP waveform without using a photodiode and reduce the number of parts of the physical quantity sensor and reduce the costs of the physical quantity sensor as compared with the first embodiment. In addition, since this embodiment employs no photodiode, an effect by external light can be eliminated.

In addition, at least the signal extracting unit 7 and the computing unit 8 in the first to fifth embodiments can be implemented by a program which controls a computer including, for example, a CPU, a memory and an interface, and hardware resources thereof. The CPU executes the processes described in the first to fifth embodiments according to the program stored in the memory.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A physical quantity sensor comprising:
a semiconductor laser which emits laser light to a measurement target;
an oscillation wavelength modulating device configured to operate the semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period;
a detector configured to detect an electrical signal including interference waveforms, the interference waveforms being caused by a self-coupling effect of the laser light emitted from the semiconductor laser and return light from the measurement target;
a signal extracting device configured to measure each cycle of the interference waveforms whenever the interference waveform is input;
a cycle correcting device configured to compare each cycle of the interference waveforms received from the signal extracting device with a reference cycle so as to correct the cycles of the interference waveforms; and
a calculating device configured to calculate at least one of displacement and velocity of the measurement target based on each of the cycles of the interference waveforms corrected by the cycle correcting device.

2. The physical quantity sensor according to claim 1, wherein the calculating device calculates at least one of the displacement and velocity of the measurement target based on: a frequency of a sampling clock to measure the cycles of the interference waveforms; the reference cycle; an average wavelength of the semiconductor laser; and a variation of the cycles corrected by the cycle correcting device with respect to the reference cycle.

3. The physical quantity sensor according to claim 1,
wherein, if the cycle of the interference waveform measured by the signal extracting device is k times as much as the reference cycle, where k is in a range of more than 0 to less than 1,
the cycle correcting device sets a cycle obtained by adding the cycle of the interference waveform and a next cycle of the interference waveform, as a correction cycle of the interference waveform and sets a waveform corresponding to the correction cycle as a single waveform, and
wherein, if the cycle of the interference waveform measured by the signal extracting device is (m−k) to less than (m+k) times as much as the reference cycle, where k is in a range of more than 0 to less than 1 and m is a natural number of 2 or more,
the cycle correcting device sets cycles obtained by dividing the cycle of the interference waveform into m equal parts, as correction cycles and sets waveforms corresponding to correction cycles as m waveforms.

4. The physical quantity sensor according to claim 3, wherein k is substantially 0.5.

5. The physical quantity sensor according to claim 1,
wherein the reference cycle is:
the cycle of the interference waveform at the time when the measurement target is in a static condition; or
an average of a predetermined number of the cycles of the interference waveforms measured immediately before correction by the cycle correcting device.

6. The physical quantity sensor according to claim 1, further comprising:

a counting device configured to count the number of interference waveforms included in the output signal in each of the first oscillation period and the second oscillation period;

a distance calculating device configured to calculate a distance to the measurement target, based on: a counting result received from the counting device; a minimum oscillation wavelength; and a maximum oscillation wavelength for a period for which the counting device counts the number of interference waveforms; and a cycle calculating device configured to calculate the cycle of the interference waveform based on the distance calculated by the distance calculating device, wherein the cycle correcting device sets the cycle obtained by the cycle calculating device as the reference cycle.

7. The physical quantity sensor according to claim 1, further comprising:

a counting device configured to count the number of interference waveforms included in the output signal in each of the first oscillation period and the second oscillation period;

a distance-proportional number calculating device configured to calculate an average of the number of interference waveforms so as to obtain a distance-proportional number, the distance-proportional number being the number of interference waveforms proportional to an average distance between the semiconductor laser and the measurement target; and a cycle calculating device configured to calculate the cycle of the interference waveform based on the distance-proportional number, wherein the cycle correcting device sets the cycle obtained by the cycle calculating device as the reference cycle.

8. A physical quantity measuring method, the method comprising:

(a) operating a semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period;

(b) detecting an electrical signal including interference waveforms, the interference waveforms being caused by a self-coupling effect of the laser light emitted from the semiconductor laser and return light from the measurement target;

(c) measuring each cycle of the interference waveform whenever the interference waveform is input;

(d) comparing each cycle of the interference waveforms with a reference cycle so as to correct the cycles of the interference waveforms; and (e) calculating at least one of displacement and velocity of the measurement target based on each of the cycles of the interference waveforms corrected in step (d).

9. The method according to claim 8, wherein step (e) comprises:

calculating at least one of the displacement and velocity of the measurement target based on: a frequency of a sampling clock to measure the cycles of the interference waveforms; the reference cycle; an average wavelength of the semiconductor laser; and a variation of the cycles corrected in step (d) with respect to the reference cycle.

10. The method according to claim 8, wherein, if the cycle of the interference waveform measured in step (c) is k times as much as the reference cycle, where k is in a range of more than 0 to less than 1, step (d) comprises:

setting a cycle obtained by adding the cycle of the interference waveform and a next cycle of the interference waveform, as a correction cycle of the interference waveform; and setting a waveform corresponding to the correction cycle as a single waveform, and wherein, if the cycle of the interference waveform measured in step (c) is (m−k) to less than (m+k) times as much as the reference cycle, where k is in a range of more than 0 to less than 1 and m is a natural number of 2 or more, step (d) comprises:

setting cycles obtained by dividing the cycle of the interference waveform into m equal parts, as correction cycles; and setting waveforms corresponding to correction cycles as m waveforms.

11. The method according to claim 10, wherein k is substantially 0.5.

12. The method according to claim 8, wherein the reference cycle is:

the cycle of the interference waveform at the time when the measurement target is in a static condition; or an average of a predetermined number of the cycles of the interference waveforms measured immediately before step (d).

13. The method according to claim 8, further comprising:

(f) counting the number of interference waveforms included in the output signal in each of the first oscillation period and the second oscillation period;

(g) calculating a distance to the measurement target, based on: a counting result in step (f); a minimum oscillation wavelength; and a maximum oscillation wavelength for a period for which the number of interference waveforms is counted in step (f); and (h) calculating the cycle of the interference waveform based on the distance calculated in step (g), wherein step (d) comprises: setting the cycle obtained in step (h) as the reference cycle.

14. The physical quantity measuring method according to claim 8, further comprising:

(f) counting the number of interference waveforms included in the output signal in each of the first oscillation period and the second oscillation period;

(g) calculating an average of the number of interference waveforms so as to obtain a distance-proportional number, the distance-proportional number being the number of interference waveforms proportional to an average distance between the semiconductor laser and the measurement target; and (h) calculating the cycle of the interference waveform based on the distance-proportional number, wherein step (d) comprises: setting the cycle obtained in step (h) as the reference cycle.

15. A non-transitory computer readable medium storing a program causing a computer to execute a process for measuring physical quantity, the process comprising:

(a) operating a semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period;

(b) detecting an electrical signal including interference waveforms, the interference waveforms being caused by a self-coupling effect of the laser light emitted from the semiconductor laser and return light from the measurement target;
(c) measuring each cycle of the interference waveform whenever the interference waveform is input;
(d) comparing each cycle of the interference waveforms with a reference cycle so as to correct the cycles of the interference waveforms; and
(e) calculating at least one of displacement and velocity of the measurement target based on each of the cycles of the interference waveforms corrected in step (d).

* * * * *